US010212321B2

United States Patent
Hu et al.

(10) Patent No.: US 10,212,321 B2
(45) Date of Patent: Feb. 19, 2019

(54) METHOD AND AN ELECTRONIC DEVICE FOR CALIBRATING A PLENOPTIC CAMERA

(71) Applicant: THOMSON Licensing, Issy-les-Moulineaux (FR)

(72) Inventors: Wei Hu, Rennes (FR); Erik Reinhard, Hédé-Bazouges (FR); Mozhdeh Seifi, Thorigne-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/721,889

(22) Filed: Sep. 30, 2017

(65) Prior Publication Data

US 2018/0097976 A1   Apr. 5, 2018

(30) Foreign Application Priority Data

Sep. 30, 2016   (EP) .................................... 16306276

(51) Int. Cl.
   *H04N 5/225*   (2006.01)
   *G02B 13/16*   (2006.01)
   (Continued)

(52) U.S. Cl.
   CPC ......... *H04N 5/2254* (2013.01); *G02B 3/0056* (2013.01); *G02B 27/0025* (2013.01);
   (Continued)

(58) Field of Classification Search
   CPC .................. G06T 2200/21; G06T 2207/10052
   (Continued)

(56) References Cited

U.S. PATENT DOCUMENTS

2013/0265485 A1   10/2013   Kang
2014/0146184 A1*   5/2014   Meng ................... H04N 17/002
                                            348/187
2016/0029017 A1*   1/2016   Liang ..................... G06T 7/80
                                            348/175

FOREIGN PATENT DOCUMENTS

WO   WO2014039327   3/2014
WO   WO2016046136   3/2016

OTHER PUBLICATIONS

Strobl, Klaus H., Stepwise Calibration of Focused Plenoptic Cameras, Jan. 7, 2016, Robotics and Mechatronics Center German Aerospace Center (DLR), p. 7. (Year: 2016).*

(Continued)

*Primary Examiner* — Anthony J Daniels
(74) *Attorney, Agent, or Firm* — Brian J. Dorini; Patricia A. Verlangieri

(57) ABSTRACT

The present disclosure concerns a method for calibrating a plenoptic camera. The plenoptic camera includes a lenslet array placed between a main lens and a photosensor, the lenslet array having a plurality of lenslets. The method is remarkable in that it includes obtaining a white image W and a model that describes light scene occlusion induced by the main lens and each lenslet. For a given pixel of the photosensor, where the model is represented by a set of parameters, obtaining a first subset of parameters values from the set of parameters in the model and obtaining a second subset of parameters value from the set of parameters in the model by performing a maximum likelihood estimation method based on the model, the white image and the first subset of parameters values, and where a union of the first and the second subsets of parameters corresponds to the set of parameters.

8 Claims, 3 Drawing Sheets

(51) Int. Cl.
G06T 7/80 (2017.01)
G02B 3/00 (2006.01)
G02B 27/00 (2006.01)
H04N 5/232 (2006.01)
H04N 17/00 (2006.01)

(52) U.S. Cl.
CPC ........... *G06T 7/80* (2017.01); *H04N 5/23245* (2013.01); *H04N 17/002* (2013.01); *G06T 2207/10052* (2013.01)

(58) Field of Classification Search
USPC ......................................................... 348/335
See application file for complete search history.

(56) References Cited

OTHER PUBLICATIONS

Ng et al., "Light Field Photography with a Hand-held Plenoptic Camera", Stanford University Technical Report CSTR Feb. 2005, Nov. 2005, pp. 1-11.

Liang et al., "A Light Transport Framework for Lenslet Light Field Cameras", ACM Transactions on Graphics, vol. 34, No. 2, Article No. 16, Feb. 2015, pp. 1-19.

Dansereau et al., "Decoding, Calibration and Rectification for Lenselet-Based Plenoptic Cameras", IEEE Conference on Computer Vision and Pattern Recognition, Portland, Oregon, Jun. 23, 2013, pp. 1027-1034.

Bok et al., "Geometric Calibration of Micro-Lens-Based Light-Field Cameras Using Line Features", 13th European Conference on Computer Vision, Zurich, Switzerland, Sep. 6, 2014, pp. 47-61.

Bouguet, J.-Y., "Camera Calibration Toolbox for Matlab", http://www.vision.caltech.edu/bouguetj/calib_doc/Camera Calibration Toolbox for Matlab, Oct. 14, 2015, pp. 1-4.

Cho et al., "Modeling the calibration pipeline of the Lytro camera for high quality light-field image reconstruction", IEEE International Conference on Computer Vision, Sydney, New South Wales, Australia, Dec. 3, 2013, pp. 3280-3287.

Sabater et al., "Light-Field Demultiplexing and Disparity Estimation", HAL archives-ouvertes.fr, https://hal.archives-ouvertes.fr/hal-00925652, Jan. 8, 2014, pp. 1-8.

Hu et al: "High Dynamic Range Imaging from a Single Plenoptic Shot", European Patent Application No. 17170784.7, filed May 12, 2017, pp. 1-19.

Hu et al., "Optical center estimation from micro-image symmetry", European Patent Application No. 17152334.3, filed Jan. 26, 2017, pp. 1-15.

Lumsdaine et al., "The Focused Plenoptic Camera", 2009 IEEE International Conference on Computational Photography (ICCP), San Francisco, California, USA, Apr. 16, 2009, pp. 1-8.

Johannsen et al., "On the Calibration of Focused Plenoptic Cameras", Time-of-Flight and Depth Imaging, Sensors, Algorithms, and Applications, LNCS vol. 8200, 2013, pp. 302-317.

Zhang et al., "Unconstrained Two-parallel-plane Model for Focused Plenoptic Cameras Calibration", Cornell University, Document arXiv:1608.04509v1, Aug. 16, 2016, pp. 1-20.

Zeller et al., "Metric Calibration of a Focused Plenoptic Camera Based on a 3D Calibration Target", ISPRS Annals of the Photogrammetry, Remote Sensing and Spatial Information Sciences, vol. III-3, 2016, XXIII ISPRS Congress, Prague, Czech Republic, Jul. 12, 2016, pp. 449-456.

Zhang et al., "Decoding and calibration method on focused plenoptic camera", Computational Visual Media, vol. 2, No. 1, Mar. 2016, pp. 57-69.

\* cited by examiner

METHOD AND AN ELECTRONIC DEVICE FOR CALIBRATING A PLENOPTIC CAMERA

REFERENCE TO RELATED EUROPEAN APPLICATION

This application claims priority from European Patent Application No. 16306276.3, entitled "A METHOD AND AN ELECTRONIC DEVICE FOR CALIBRATING A PLENOPTIC CAMERA", filed on Sep. 30, 2016, the contents of which are hereby incorporated by reference in its entirety.

TECHNICAL FIELD

The disclosure relates to a technique for calibrating and configuring a plenoptic camera.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Plenoptic cameras are a category of cameras that belongs to the family of light field acquisition device. A particular feature of this category of cameras is to use a lenslet array that is placed between a main lens and a photosensor. The architecture of a plenoptic camera is described in several documents such as the document WO2016046136, or in document US2013265485, or in document WO2014039327, or in the article entitled "*The Focused Plenoptic Camera*" by Andrew Lumsdaine and Todor Georgiev. Once a 4D light field data is acquired by a plenoptic camera, it is possible to perform refocusing and/or change of viewpoints aposteriori, without an excessive amount of processing operations. Hence, these kinds of devices seem to be more and more used in the future.

Thus, plenoptic camera calibration is a hectic research topic due to the widespread use of plenoptic cameras on the markets. Usually, in a calibration process, two kind of parameters can be estimated/determined: the extrinsic camera parameters and the intrinsic camera parameters. The extrinsic camera parameters relate to position and rotation of the model points in relation to a plenoptic camera, whereas the intrinsic camera parameters define/parametrize the projection of light rays through the plenoptic camera onto a photosensor comprised in the plenoptic camera.

In the state of the art, in order to determine intrinsic parameters, it is necessary to define a model that depicts the projection process onto the photosensor of a plenoptic camera. Usually, the definition of a model induces a number of intrinsic parameters to be determined, and the more accurate and complex a model is, the more intrinsic parameters it defines and uses.

A first model is described in the article entitled "*On the Calibration of Focused Plenoptic Cameras*" by Ole. Johannsen et al. where it is proposed to minimize an energy model based upon the thin lens equation. The model allows to estimate intrinsic and extrinsic parameters and corrects for radial lateral as well as radial depth distortion.

A second model is described in the article entitled "*Unconstrained Two-parallel-plane Model for Focused Plenoptic Cameras Calibration*" by Chunping Zhang et al., that uses 7 parameters to describe a 4D light field acquired by a plenoptic camera.

A third model is described in the article entitled "*Metric Calibration of a focused plenoptic camera based on 3D calibration target*" by N. Zeller et al., that considers lateral distortion of the intensity image as well as virtual depth distortion.

A fourth model is described in the article entitled "*A Light Transport Framework for Lenslet Light Field Cameras*" by Chia-Kai Liang and Ravi Ramamoorthi, that considers the full space-angle sensitivity profile of the photosensor within a plenoptic camera.

Once a model is defined according to one of the previously-mentioned articles, a calibration process is usually performed. In some cases, such calibration process comprises the solving of a non-linear optimization process with regards to a cost function. However, when the number of parameters in the model is important (for example, up to 21 parameters are described in the model described in the article "*decoding, calibrating and rectification for lenslet-based plenoptic cameras*", by D. G. Dansereau et al.), the calibration process is complex from a computational point of view. In order to reduce the complexity of such calibration process, it was proposed in the article entitled "*Geometric calibration of micro-lens based light field cameras using line features*" by Y. Bok et al., to use a linear method for computing a first estimation of the parameters of the model, and then to refine the obtained results via a non-linear optimization process. However, this approach is still complex from a computational point of view.

Hence, there is a need for providing another model that can be both relevant in term of physical description of the projection process within a plenoptic camera, and for which the intrinsic parameters can be easily determined, from a computational point of view, via a calibration process.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for calibrating a plenoptic camera, said plenoptic camera comprising a lenslet array placed between a main lens and a photosensor, said lenslet array comprising a plurality of lenslets. The method is remarkable in that it comprises:

obtaining a white image W and a model that describes light scene occlusion induced by the main lens and each lenslet, for a given pixel of said photosensor, wherein said model is represented by a set of parameters;

obtaining a first subset of parameters values from said set of parameters in said model;

obtaining a second subset of parameters value from said set of parameters in said model by performing a maximum likelihood estimation method based on said model, said white image and said first subset of parameters values, and wherein a union of said first and said second subsets of parameters corresponds to said set of parameters.

Hence, the proposed technique increases the accuracy and efficiency of a calibration method by estimating some parameters first and then optimizing the other parameters based on an image formation model. For reminders, a white image is captured from a uniform scene. Hence usually, pixel intensities are all close to 1, and gradually fade away from the image center symmetrically due to the vignetting effect. Indeed, pixel intensities in a white image are almost uniform except the gradual fade-away caused by vignetting. If the white image is normalized, then pixel intensities are close to or equal to 1.

Hence, such technique can be used to calibrate (in an efficient way) parameters of a plenoptic camera defined by a model (as one of those previously mentioned).

In a preferred embodiment, the method is remarkable in that, for said given pixel, said model specifies that it records a light intensity $I(x_p, y_p)$ according the following equation:

$$I(x_p, y_p) = \int_{x=-\infty}^{\infty}\int_{y=-\infty}^{\infty}\int_{\mu=-\infty}^{\infty}\int_{\nu=-\infty}^{\infty} L(x+\lambda\mu, y+\lambda\nu) \times B_m(x, y, \mu, \nu)$$
$$B_l\left(\frac{x-c_x^l}{d}, \frac{y-c_y^l}{d}\right) rect\left(-\frac{f_l\mu+x_p}{p}, -\frac{f_l\nu+y_p}{p}\right)$$
$$\rho(f_l^{-1}x+\mu, f_l^{-1}y+\nu)d\nu d\mu dy dx,$$

where function $L(.,.)$ is a source light field, and functions $B_m(\bullet, \bullet, \bullet, \bullet)$ and $B_l(\bullet, \bullet)$ are circular functions for modeling respectively occlusion of the main lens and the l-th lenslet, and function $rect(\bullet, \bullet)$ is a 2D rectangular function, and function $\rho(\bullet, \bullet)$ is an 2D function that describes the angular profile of the sensor, and where coordinates $(x, y, \mu, \nu)$ are coordinates induced by a two plane parametrization, a first plane being positioned at the photosensor level, and a second plane being positioned at the lenslet array level, and where parameter $(c_x^l, c_y^l)$ corresponds to the coordinates of the lenslet l's optical center, parameter $f_l$ corresponds to lenslet focal length, and where p corresponds to the photosensor pitch size, and where parameter $\lambda$ is a depth parameter, and parameter d corresponds to a lenslet aperture size.

More precisely, the parameter $\lambda$ can also be defined as the distance between a source surface and the lenslet array, where a source surface should be in a 3D scene. However, for the sake of mathematical modeling, we assume a virtual plane in front of the lenslet array and after the main lens, which gives the source light rays.

It should be noted that such model is better from the previous ones in the sense it models the image formation in a lenslet-based plenoptic camera more accurately with fewer parameters. For example, the technique described in the previously mentioned article "*decoding, calibrating and rectification for lenslet-based plenoptic cameras*", by D. G. Dansereau et al., approximates each pixel as integrating along a single ray, whereas each pixel integrates light from a volume, which is considered in the proposed model.

Moreover, the proposed model uses few parameters compared to the ones from the prior art.

In a preferred embodiment, the method is remarkable in that said first subset of parameters value comprises $\theta_k = \{F, d, p\}$ and $\theta_e = \{c_x^m, c_y^m, \{c_x^l, c_y^l\}_{l=1}^k\}$, where parameter F corresponds to the main lens F-number, parameter $(c_x^m, c_y^m)$ corresponds to the coordinates of the main lens optical center, and said second subset of parameters values comprises $\theta_u = \{f, f_l, \sigma\}$, where parameter f corresponds to a main lens focal length, and parameter $\sigma$ corresponds to an angular exponent that is a parameter defining the function $\rho$.

In a preferred embodiment, the method is remarkable in that parameters values comprised in $\theta_k$ are known camera metadata.

In a preferred embodiment, the method is remarkable in that parameters values comprised in $\theta_e$ are obtained from calibration techniques.

In a preferred embodiment, the method is remarkable in that functions $B_m(\bullet, \bullet, \bullet, \bullet)$ and $B_l(\bullet, \bullet)$ are defined according to the following equations:

$$B_m(x, y, \mu, \nu) = \begin{cases} s_1(x, y), & \left[x - \frac{f}{f_l}(x_p - c_x^l) - c_x^m\right]^2 + \left[y - \frac{f}{f_l}(y_p - c_y^l) - c_y^m\right]^2 \le \left(\frac{D}{2}\right)^2 \\ 0, & \text{otherwise} \end{cases}$$

and $$B_l\left(\frac{x-c_x^l}{d}, \frac{y-c_y^l}{d}\right) \begin{cases} s_2(x, y), & (x-c_x^l)^2 + (y-c_y^l)^2 \le \left(\frac{d}{2}\right)^2 \\ 0, & \text{otherwise} \end{cases}$$

where $s_1(x, y)$ and $s_2(x, y)$ are function that describe the effect on the luminance of incoming light rays due to respectively the main lens and the lenslet, and where parameter D corresponds to a main lens aperture size, and where parameter $(c_x^m, c_y^m)$ corresponds to the coordinates of the main lens optical center, where parameter f corresponds to a main lens focal length, and where $\mu$ and $\nu$ have the special forms of $$\mu = \frac{x_p - c_x^l}{f_l} \text{ and } \nu = \frac{y_p - c_y^l}{f_l}.$$

In a preferred embodiment, the method is remarkable in that the performing of the maximum likelihood estimation method based on said model is done according to some constraints on said parameters of said second subset of parameters.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc.

In another embodiment of the disclosure, it is proposed an electronic device for calibrating a plenoptic camera, said plenoptic camera comprising a lenslet array placed between a main lens and a photosensor, said lenslet array comprising a plurality of lenslets. The electronic device is remarkable in that it comprising a memory, and at least one processor coupled to the memory, the at least one processor being configured to:

obtain a white image W and a model that describes light scene occlusion induced by the main lens and each lenslet, for a given pixel of said photosensor, wherein said model is represented by a set of parameters;

obtain a first subset of parameters values from said set of parameters in said model;

obtain a second subset of parameters value from said set of parameters in said model by performing a maximum likelihood estimation based on said model, said white image and said first subset of parameters values, and wherein a union of said first and said second subsets of parameters corresponds to said set of parameters.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

Figure 3:
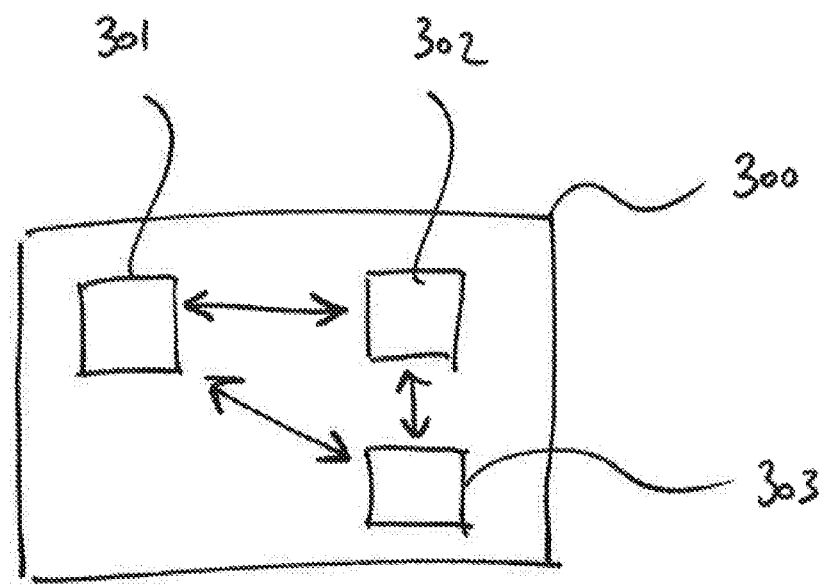
FIG. 3 presents an example of device that can be used to perform a method disclosed in the present document.

As explained in the article "*A Light Transport Framework for Lenslet Light Field Cameras*" by Chia-Kai Liang and Ravi Ramamoorthi, a 2D mathematical model of the image formation process in a lenslet-based plenoptic camera is described. More precisely, as shown in FIG. 3(*a*) of the article "*A Light Transport Framework for Lenslet Light Field Cameras*", light rays in the scene first propagate to the main lens, get refracted and then continue propagating to the lenslet array if not occluded by the main lens. Light rays that arrive at one lenslet are then refracted and propagate to the imaging sensor to form pixels if not occluded by the lenslet. A 2D model is derived to model this light transport process in 2D. The goal of this 2D model is to derive a direct relationship between the input light field denoted as $L_\lambda$ from a Lambertian surface at depth $\lambda$, and the recorded output light field sample at the photosensor at image coordinates $(x_p, y_p)$ for pixel p, denoted as $I(x_p, y_p)$. The local two-plane parameterization is deployed in this article, i.e., $(x, \mu)$, where $x$ is the spatial coordinate and $\mu$ is the angular coordinate.

Given the source light field $L_\lambda$ and the photosensor profile, each pixel value $I(x_p, y_p)$ is described as the integral of the product of the incoming light field and the sensor profile in the 2D model in:

$$I(x_p, y_p) = \int_{x=-\infty}^{\infty} \int_{\mu=-\infty}^{\infty} L(x + \lambda\mu) rect(F\mu) \qquad (Eq.(1))$$

$$rect\left(\frac{x - c_x^l}{d}\right) rect\left(-\frac{f_l \mu + x_p}{p}\right) \rho(f_l^{-1} x + \mu) d\mu dx,$$

where $rect(\bullet)$ is a 1D rectangular function, and the three $rect(\bullet)$ functions in Eq. (1) describe the occlusion of the main lens, the occlusion of the l-th lenslet and the spatial profile of the sensor, respectively. $\rho(\bullet)$ is an 1D function that describes the angular profile of the sensor, and is assumed in this article to be:

$$\rho(\mu) = \cos^\sigma(\tan^{-1}(\mu)), \qquad (Eq.(2))$$

where $\sigma \in \mathbb{R}$ gives the angular sensitivity of the sensor. Higher values of $\sigma$ means the photosensor is more directionally selective. The physical meaning of the camera parameters in Eq. (1) and their values for the Lytro camera, if known, are listed in Table 1.

TABLE 1

Camera Parameters in the model of Equations (1) and (2).

| Parameter | Notation | Value in Lytro if known |
|---|---|---|
| Main lens F-number | F | 2.0 |
| Main lens focal length | f | — |
| Main lens aperture size | D | — |
| Lenslet focal length | $f_l$ | — |
| Main lens optical center | $(c_x^m, c_y^m)$ | — |
| Lenslet l's optical center | $(c_x^l, c_y^l)$ | — |

TABLE 1-continued

Camera Parameters in the model of Equations (1) and (2).

| Parameter | Notation | Value in Lytro if known |
|---|---|---|
| Lenslet aperture size | d | 14.0 μm |
| Photosensor pitch size | p | 1.4 μm |
| Angular exponent | σ | — |

In order to describe the 4D light field in practice, the 2D model in Eq. (1) is extended to a 4D model in this disclosure. First, the parameterization is extended from (x, μ) to (x, y, μ, v), where y is the other spatial coordinate and v is the other angular coordinate. Second, the masking function for describing the occlusion of the main lens and each lenslet is extended from rectangular functions to circular functions. Third, the spatial and angular profile of the sensor is extended to 4D. Here is the final 4D modeling, with all the camera parameters listed in Table 1:

$$I(x_p, y_p) = \quad \text{(Eq.(3))}$$

$$\int_{x=-\infty}^{\infty} \int_{y=-\infty}^{\infty} \int_{\mu=-\infty}^{\infty} \int_{v=-\infty}^{\infty} L(x+\lambda\mu, y+\lambda v) \times B_m(x, y, \mu, v)$$

$$B_l\left(\frac{x-c_x^l}{d}, \frac{y-c_y^l}{d}\right) rect\left(-\frac{f_l\mu+x_p}{p}, -\frac{f_l v+y_p}{p}\right)$$

$$\rho(f_l^{-1}x+\mu, f_l^{-1}y+v) dv\, d\mu\, dy\, dx.$$

Here, $B_m(\cdot, \cdot, \cdot, \cdot)$ and $B_l(\cdot, \cdot)$ are circular functions for modeling the occlusion of the main lens and the l-th lenslet respectively, which take the forms:

$$B_m(x, y, \mu, v) = \quad \text{(Eq.(4))}$$

$$\begin{cases} s_1(x, y), & \left[x-\frac{f}{f_l}(x_p-c_x^l)-c_x^m\right]^2 + \left[y-\frac{f}{f_l}(y_p-c_y^l)-c_y^m\right]^2 \le \left(\frac{D}{2}\right)^2 \\ 0, & \text{otherwise} \end{cases} \text{ and}$$

$$B_l\left(\frac{x-c_x^l}{d}, \frac{y-c_y^l}{d}\right) = \begin{cases} s_2(x, y), & (x-c_x^l)^2 + (y-c_y^l)^2 \le \left(\frac{d}{2}\right)^2 \\ 0, & \text{otherwise} \end{cases} \quad \text{(Eq.(5))}$$

Here $s_1(x, y)$ and $s_2(x, y)$ are functions that describe the effect on the luminance of the light ray due to respectively the main lens and the lenslet. When the main lens and the lenslet are perfect and modeled as a thin lens, $s_1(x, y)=1$ for all (x, y) respecting the first condition (i.e.

$$\left[x-\frac{f}{f_l}(x_p-c_x^l)-c_x^m\right]^2 + \left[y-\frac{f}{f_l}(y_p-c_y^l)-c_y^m\right]^2 \le \left(\frac{D}{2}\right)^2,$$

and $s_2(x, y)=1$ for all (x, y) respecting the second condition (i.e.

$$(x-c_x^l)^2 + (y-c_y^l)^2 \le \left(\frac{d}{2}\right)^2.$$

Otherwise, the functions $s_1(x, y)$ and $s_2(x, y)$ may vary according to the position that the light ray hits the main lens and/or the lenslet. For example, $s_1(x, y)$ is close to 1 when the light ray hits close to the optical axis, while it is small when it hits the boundary of the lens. The specific form of $s_1(x, y)$ or $s_2(x, y)$ depends on the shape and quality of the lens (either the main lens or the lenslet).

Note that D=f/F, so D can be derived from f and F, where F is often a parameter with a known value.

The function rect($\cdot$, $\cdot$) in Eq. (3) is a 2D rectangular function that describes the spatial profile of the sensor, and $\rho(\cdot, \cdot)$ in Eq. (3) is a 2D function that describes the angular profile of the sensor. Specifically:

$$rect\left(-\frac{f_l\mu+x_p}{p}, -\frac{f_l v+y_p}{p}\right) = \begin{cases} 1, & \mu=-\frac{x_p}{f_l}, v=-\frac{y_p}{f_l} \\ 0, & \text{otherwise} \end{cases} \quad \text{(Eq.(6))}$$

and $$\rho(f_l^{-1}x+\mu, f_l^{-1}y+v) = \cos^\sigma\left(\tan^{-1}\sqrt{(f_l^{-1}x+\mu)^2 + (f_l^{-1}y+v)^2}\right) \quad \text{(Eq.(7))}$$

Note that, the lower and upper limits in the integral of Eq. (3) are minus infinity and infinity for mathematical description. In practice, the limits of (x, y) are set as the boundary in x and y dimensions of the corresponding lenslet of ($x_p$, $y_p$), because $I(x_p, y_p)$ will be 0 when light rays don't get through the corresponding lenslet. μ and v are set as $$\mu = -\frac{x_p}{f_l}, v = -\frac{y_p}{f_l}$$

according to Eq. (6).

The 4D model in Eq. (3) is fundamental in modeling the light transport in a lenslet-based plenoptic camera. It is crucial for the correction of image degradation caused by optical systems such as vignetting as well as a variety of applications, such as understanding the fundamental limits of camera resolution and applying light field raw images to post-processing applications (e.g., the acquisition of 3D depth and the reconstruction of high dynamic range light fields).

Nevertheless, some or all of the camera parameters in the model are unknown from the camera metadata, which requires parameter estimation prior to applications. This motivates the novel estimation of unknown parameters proposed in this disclosure, which will be discussed in the next section.

Figure 1:
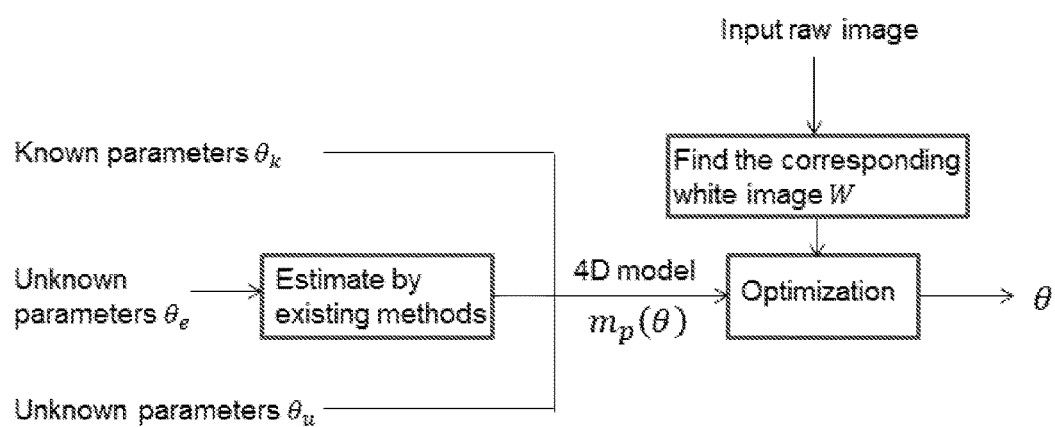
FIG. 1 presents a flowchart of a calibration method of a plenoptic camera according to one embodiment of the disclosure.

An overview of the proposed method is provided in FIG. 1. Indeed, FIG. 1 presents a flowchart of a calibration method of a plenoptic camera according to one embodiment of the disclosure.

Firstly, certain camera parameters, e.g., the coordinates of the optical center of the main lens and all the lenslets, are estimated by existing algorithms. They are chosen to be estimated in a first step for three reasons:

1) there exist several algorithms that estimate these parameters efficiently and accurately (such as the one described in the document US2016/0029017);

2) the computation complexity of the estimation in the second step will be reduced a lot considering the number of these parameters (2*(M+1) if the number of lenslets is M);

3) the estimation of these parameters makes the optimization in the second step more tractable, because it reduces the multiplication of unknown variables. Then in the second step, these estimated parameters are treated as known parameters, and the other parameters are estimated via maximum likelihood estimation, which is discussed later in the present document.

It should be noted that the model of Eq. (3) proposed for describing the projection process in a plenoptic camera is represented by the parameter set $\theta=\{F, f, f_l, c_x^m, c_y^m, \{c_x^l, c_y^l\}_{l=1}^k, d, \rho, \sigma\}$, where k is the number of lenslets.

As mentioned previously, it is assumed that some parameters are known from the camera metadata while the others remain unknown.

According to one embodiment of the disclosure, it is proposed to estimate the coordinates of the optical center of the main lens and all the lenslets from existing algorithms first and then optimize the other unknown parameters by maximum likelihood estimation based on the 4D model of Eq. (3).

Specifically, taking Lytro as an example, the following parameters are known from the camera metadata, whose values are listed in Table 1.

$$\theta_k = \{F, d, \rho\}.$$

Among the unknown parameters, the coordinates of the optical center of the main lens $\{c_x^m, c_y^m\}$ and all the lenslets $\{c_x^l, c_y^l\}_{l=1}^k$ are efficiently estimated ahead by existing algorithms. In particular, $\{c_x^m, c_y^m\}$ may be estimated by using symmetries induced by the lenslets array, and $\{c_x^l, c_y^l\}_{l=1}^k$ may be estimated by some existing algorithms (such as the ones mentioned in the previously cited article "*decoding, calibrating and rectification for lenslet-based plenoptic cameras*", or in the article entitled "*modeling the calibration pipeline of the Lytro camera for high quality light field image reconstruction*" by D. Cho et al., or in the article entitled "*Light field demultiplexing and disparity estimation*" by N. Sabater et al.). Here the corresponding white image refers to the white image that has the closest camera parameters (such as zoom and focus) in the given dataset as the target image. Note that often several white images are captured under the same parameter set and then averaged to attenuate the effect of sensor noise. The parameters to estimate ahead are referred to as $$\theta_e = \{c_x^m, c_y^m, \{c_x^l, c_y^l\}_{l=1}^k\}.$$

The rest of unknown parameters remain to be estimated:

$$\theta_u = \{f, f_l, \sigma\}.$$

In one embodiment of the disclosure, they are estimated from the corresponding white image by maximum likelihood estimation, which finally leads to a nonlinear optimization problem.

Indeed, as the proposed modeling in Eq. (3) accurately models plenoptic images (including white images) and that white images are often provided by the camera manufacturers, it is proposed, according to one embodiment of the disclosure, to statistically estimate the unknown parameters $\theta_u$ from the corresponding white image W by maximum likelihood estimation. That is, the set of values of the model parameters that maximize the likelihood function are selected. Intuitively, this maximizes the consistency of the proposed model with the observed white image. Specifically, the maximum likelihood estimator of $\theta_u$ is $$\hat{\theta}_u(W) = \underset{\theta_u}{\operatorname{argmax}} g(W \mid \theta_u), \quad \text{(Eq.(8))}$$

where $g(W|\theta_u)$ is the distribution of a function of W given $\theta_u$. In one embodiment, $g(\cdot)$ is assumed to be an exponential function of the sum of squared differences between each pixel value $W_p$ in the white image W and its modeled value $m_p(\theta_u)$ by Eq. (3), or equivalently the noise distribution function considering that $m_p(\theta_u)$ accurately models W. This choice of $g(\cdot)$ is to enforce the model with estimated parameters to be as close to the white image as possible. Parameters will be penalized a lot if the resulting modelled white image is quite different from the captured white image.

Specifically, as the luminance of a white image is uniform, $L(x+\lambda\mu, y+\lambda v)$ is assumed to be 1, which means $I(x_p, y_p)=m_p(\theta_u)$. This leads to the following model for $g(W|\theta_u)$:

$$g(W|\theta_u) = \exp\{-\Sigma_{p=1}^N (m_p(\theta_u)-W_p)^2/2\eta^2\}, \quad \text{(Eq. (9))}$$

where N is the number of pixels in W, and $\eta$ is a scalar denoting the standard deviation of noise. Substituting Eq. (9) into (8) leads to $$\hat{\theta}_u(W) = \underset{\theta_u}{\operatorname{argmax}} g(W \mid \theta_u) = \underset{\theta_u}{\operatorname{argmax}} \exp\left\{-\sum_{p=1}^N (m_p(\theta_u) - W_p)^2/2\eta^2\right\}, \quad \text{(Eq.(10))}$$

Taking the negative of the natural logarithm of the right side of Eq. (10) leads to $$\hat{\theta}_u(W) = \underset{\theta_u}{\operatorname{argmin}} \sum_{p=1}^N (m_p(\theta_u) - W_p)^2/2\eta^2, \quad \text{(Eq.(11))}$$

which is equivalent to the following optimization problem as $\eta$ is a scalar:

$$\min_{\theta_u} \sum_{p=1}^N (m_p(\theta_u) - W_p)^2 \quad \text{(Eq.(12))}$$

Further, the feasible space of $\theta_u = \{f, f_l, \sigma\}$ can be added to the above optimization:

$f \geq 0$ $f_l \geq 0$ $\sigma_1 \leq \sigma \leq \sigma_2, \sigma \in \mathbb{N}$ Here $\sigma$ may be constrained to a discrete set of natural numbers $\mathbb{N}$ bounded by $\sigma_1$ and $\sigma_2$ to reduce the searching space. Hence, the final optimization problem is:

$$\min_{f, f_l, \sigma} \sum_{p=1}^N (m_p(f, f_l, \sigma) - W_p)^2 \quad \text{(Eq.(13))}$$

-continued subject to $f \geq 0$ $f_l \geq 0$ $\sigma_1 \leq \sigma \leq \sigma_2, \sigma \in \mathbb{N}$ This is a nonlinear optimization problem, and may be solved by a nonlinear least-squares solver, such as the function "lsqnonlin" in Matlab.

Finally, note that, as $f_l$ and $\sigma$ remain the same for one plenoptic camera, after they are estimated, the parameters to estimate for new target images are only $\{f, c_x^m, c_y^m, \{c_x^l, c_y^l\}_{l=1}^k\}$. As $\{c_x^m, c_y^m, \{c_x^l, c_y^l\}_{l=1}^k\}$ may be estimated by efficient existing algorithms, the only parameter to be estimated via optimization is f, which significantly simplifies the estimation process.

The estimated parameters enable a variety of applications, especially when deployed together with the extended 4D model in Eq. (3). A novel example is the reconstruction of high dynamic range light fields from a single plenoptic capture by exploiting vignetting, where vignetting may be modeled by Eq. (3).

Specifically, vignetting appears in each micro-image as illuminance attenuation relative to the corresponding lenslet center. As a consequence, well-exposed pixels in one view may be over- or under-exposed in some other views. Hence, well-exposed pixels in one view can be leveraged to reconstruct badly exposed pixels in a different view, provided that they image the same 3D scene locations. This method allows solutions that neither involve approximative methods, nor hardware modifications.

Vignetting can be estimated from the corresponding white image in one embodiment, whereas it is more accurate to model it using Eq. (3), i.e., $m_p(\theta)$ for each pixel p. Then better reconstruction of high dynamic range light fields can be achieved by more accurate modeling of vignetting.

Figure 2:
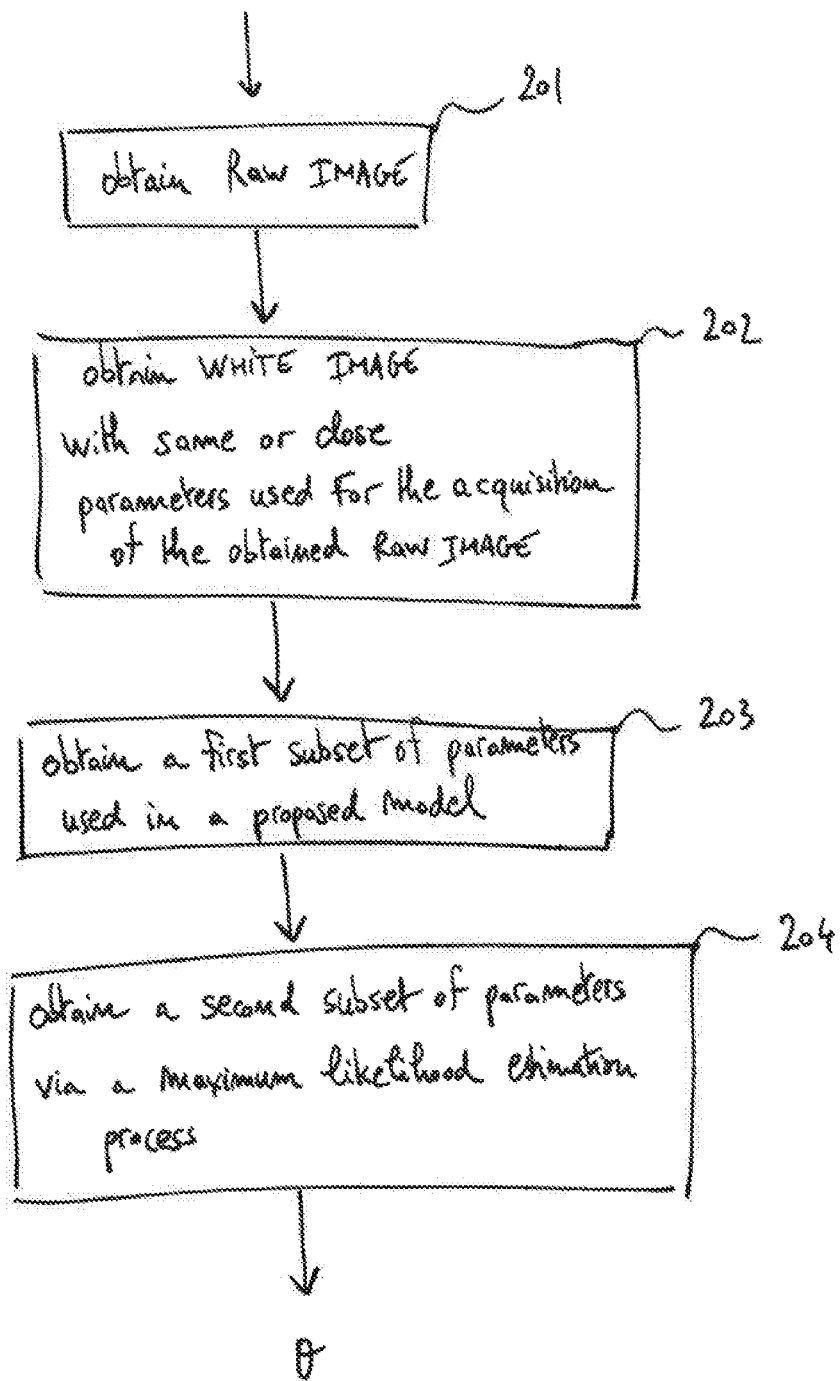
FIG. 2 presents a flowchart of a method executed by a processor of an electronic device for calibrating a plenoptic camera, according to one embodiment of the disclosure.

The FIG. 2 presents a flowchart of a method executed by a processor of an electronic device for calibrating a plenoptic camera, according to one embodiment of the disclosure.

More precisely, an electronic device obtains in a step referenced 201 a raw image acquired by a plenoptic camera to be calibrated.

Then, in a step referenced 202, the electronic device obtains a white image with the same acquisition parameters used for acquiring the raw image mentioned previously.

In a step referenced 203, the electronic device uses the model described in Eq. (3) for calibrating the plenoptic camera. More precisely, the electronic device obtains a first subset of parameters from the set of parameters $\theta = \{F, f, f_l, c_x^m, c_y^m, \{c_x^l, c_y^l\}_{l=1}^k, d, p, \sigma\}$.

Such first subset corresponds to the union of the set $\theta_k = \{F, d, p\}$ and $\theta_e = \{c_x^m, c_y^m, \{c_x^l, c_y^l\}_{l=1}^k\}$. More precisely, in one embodiment of the disclosure, the set $\theta_k = \{F, d, p\}$ is obtained by reading or receiving the values of these parameters. The values of the parameters of $\theta_e = \{c_x^m, c_y^m, \{c_x^l, c_y^l\}_{l=1}^k\}$ can be either determined by said electronic device according to known techniques as mentioned previously, or by receiving (or reading in a memory) explicitly the values of these parameters determined by another electronic device.

Then, in a step referenced 204, the electronic device obtains (i.e. it determines or computes) a second subset of parameters (i.e. the subset $\theta_u = \{f, f_l, \sigma\}$ of the set of parameters $\theta$ associated with the model of Eq. (3). In order to determine the parameters of $\theta_u = \{f, f_l, \sigma\}$, the electronic device performs a maximum likelihood estimation. As there is few parameters to determine, such process is not complex from a computational point of view.

Then, in one embodiment of the disclosure, the electronic device outputs the values of the parameters of the set $\theta$. In one embodiment, these parameters are stored in a memory unit of the electronic device. Then, they can be used for post-processing purpose.

The FIG. 3 presents an example of device that can be used to perform a method disclosed in the present document.

Such device referenced 300 comprises a computing unit (for example a CPU, for "Central Processing Unit"), referenced 301, and one or more memory units (for example a RAM (for "Random Access Memory") block in which intermediate results can be stored temporarily during the execution of instructions of a computer program, or a ROM block in which, among other things, computer programs are stored, or an EEPROM ("Electrically-Erasable Programmable Read-Only Memory") block, or a flash block) referenced 302. Computer programs are made of instructions that can be executed by the computing unit. Such device 300 can also comprise a dedicated unit, referenced 303, constituting an input-output interface to allow the device 300 to communicate with other devices. In particular, this dedicated unit 303 can be connected with an antenna (in order to perform communication without contacts), or with serial ports (to carry communications "contact"). It should be noted that the arrows in FIG. 3 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In one embodiment of the disclosure, the electronic device depicted in FIG. 3 can be comprised in a camera device that is configure to capture images (i.e. a sampling of a light field). These images are stored on one or more memory units. Hence, these images can be viewed as bit stream data (i.e. a sequence of bits). Obviously, a bit stream can also be converted on byte stream and vice versa.

The invention claimed is:

1. A method for calibrating a plenoptic camera, said plenoptic camera comprising a lenslet array placed between a main lens and a photosensor, said lenslet array comprising a plurality of lenslets, the method being characterized in that it comprises:
   obtaining a white image W and a model that describes light scene occlusion induced by the main lens and each lenslet for a given pixel of said photosensor, wherein said model is represented by a set of parameters;
   obtaining values of a first subset of parameters from said set of parameters in said model;
   obtaining values of a second subset of parameters from said set of parameters in said model by performing a maximum likelihood estimation method based on said model, said white image and said values of a first subset of parameters, wherein a union of said first subset of parameters and said second subset of parameters corresponds to said set of parameters; and
   applying the set of parameters to the plenoptic camera.

2. The method according to claim 1, wherein, for said given pixel, said model specifies that it records a light intensity $I(x_p, y_p)$ according the following equation:

$$I(x_p, y_p) = \int_{x=-\infty}^{\infty}\int_{y=-\infty}^{\infty}\int_{\mu=-\infty}^{\infty}\int_{v=-\infty}^{\infty} L(x+\lambda\mu, y+\lambda v) \times B_m(x, y, \mu, v)$$

$$B_l\left(\frac{x-c_x^l}{d}, \frac{y-c_y^l}{d}\right) rect\left(-\frac{f_l\mu+x_p}{p}, -\frac{f_l v+y_p}{p}\right) \quad 5$$

$$\rho(f_l^{-1}x+\mu, f_l^{-1}y+v)dv\,d\mu\,dy\,dx,$$

where function $L(\bullet, \bullet)$ is a source light field, and functions $B_m(\bullet, \bullet, \bullet, \bullet)$ and $B_l(\bullet, \bullet)$ are circular functions for modeling respectively occlusion of the main lens and an l-th lenslet, and function $rect(\bullet, \bullet)$ is a 2D rectangular function, and function $\rho(\bullet, \bullet)$ is an 2D function that describes an angular profile of photosensor, and where coordinates $(x, y, \mu, v)$ are coordinates induced by a two plane parametrization, a first plane being positioned at a photosensor level, and a second plane being positioned at a lenslet array level, and where parameter $(c_x^l, c_y^l)$ corresponds to the coordinates of the l-th lenslet' optical center, parameter $f_l$ corresponds to lenslet focal length, and where p corresponds to the photosensor pitch size, and where parameter $\lambda$ is a depth parameter, and parameter d corresponds to a lenslet aperture size.

3. The method according to claim 2, wherein said first subset of parameters comprises $\{F, d, p\}$ and $\{c_x^m, c_y^m, \{c_x^l, c_y^l\}_{l=1}^k\}$, where parameter F corresponds to the main lens F-number, parameter $(c_x^m, c_y^m)$ corresponds to the coordinates of the main lens optical center, and said second subset of parameters comprises $\{f, f_l, \sigma\}$, where parameter f corresponds to a main lens focal length, and parameter $\sigma$ corresponds to an angular exponent that is a parameter defining the function $\rho$.

4. The method according to claim 3, wherein values of parameters comprised in $\{F, d, p\}$ are known camera metadata.

5. The method according to claim 3, wherein values of parameters comprised in $\{c_x^m, c_y^m, \{c_x^l, c_y^l\}_{l=1}^k\}$ are obtained from calibration techniques.

6. The method according to claim 2, wherein functions $B_m(\bullet, \bullet, \bullet, \bullet)$ and $B_l(\bullet, \bullet)$ are defined according to the following equations:

$$B_m(x, y, \mu, v) =$$

$$\begin{cases} s_1(x,y), & \left[x-\frac{f}{f_l}(x_p-c_x^l)-c_x^m\right]^2 + \left[y-\frac{f}{f_l}(y_p-c_y^l)-c_y^m\right]^2 \le \left(\frac{D}{2}\right)^2 \\ 0, & \text{otherwise} \end{cases}$$

and $$B_l\left(\frac{x-c_x^l}{d}, \frac{y-c_y^l}{d}\right) \begin{cases} s_2(x,y), & (x-c_x^l)^2+(y-c_y^l)^2 \le \left(\frac{d}{2}\right)^2 \\ 0, & \text{otherwise} \end{cases}$$

where $s_1(x, y)$ and $s_2(x, y)$ are functions that describe an effect on the luminance of incoming light rays due to the main lens and the lenslet, respectively, and where parameter D corresponds to a main lens aperture size, and where parameter $(c_x^m, c_y^m)$ corresponds to the coordinates of the main lens optical center, where parameter f corresponds to a main lens focal length, and where $\mu$ and $v$ have the forms of $$\mu = \frac{x_p - c_x^l}{f_l} \text{ and } v = \frac{y_p - c_y^l}{f_l}.$$

7. The method according to claim 1, wherein the performing of the maximum likelihood estimation method based on said model is done according to some constraints on said second subset of parameters.

8. An electronic device for calibrating a plenoptic camera, said plenoptic camera comprising a lenslet array placed between a main lens and a photosensor, said lenslet array comprising a plurality of lenslets, the electronic device comprising a memory, and at least one processor coupled to the memory, the at least one processor being characterized in that it is configured to:
   obtain a white image W and a model that describes light scene occlusion induced by the main lens and each lenslet for a given pixel of said photosensor, wherein said model is represented by a set of parameters;
   obtain values of a first subset of parameters from said set of parameters in said model;
   obtain values of a second subset of parameters from said set of parameters in said model by performing a maximum likelihood estimation based on said model, said white image and values of said first subset of parameters, wherein a union of said first subset of parameters and said second subset of parameters corresponds to said set of parameters; and
   apply the set of parameters to the plenoptic camera.

\* \* \* \* \*